April 22, 1947. C. J. McDOWALL ET AL 2,419,274
COUNTERWEIGHTED CRANKSHAFT
Filed April 8, 1944
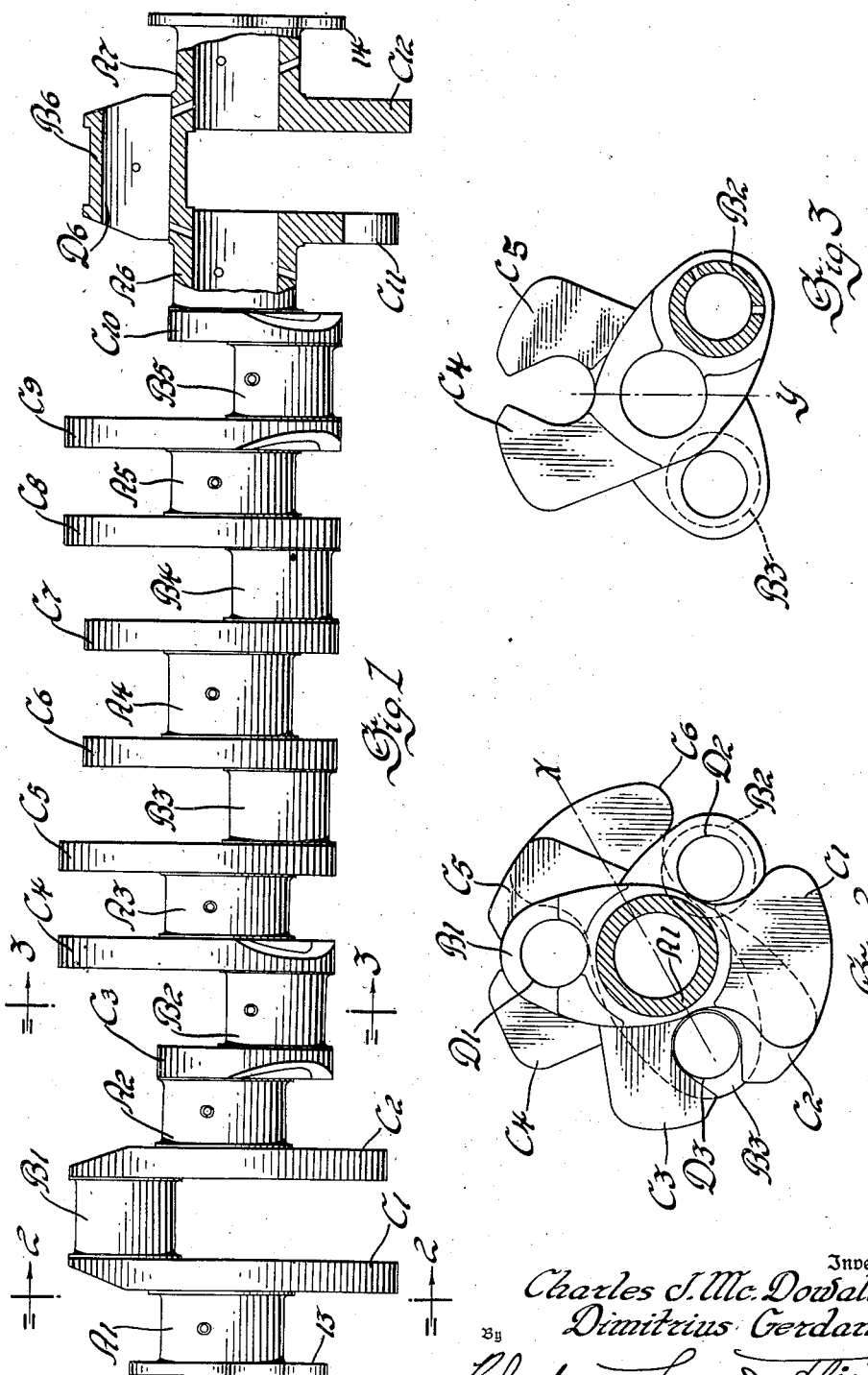

Patented Apr. 22, 1947

2,419,274

UNITED STATES PATENT OFFICE 2,419,274

COUNTERWEIGHTED CRANKSHAFT

Charles J. McDowall and Dimitrius Gerdan, Indianapolis, Ind., assignors to General Motors Corporation, Detroit, Mich., a corporation of Delaware Application April 8, 1944, Serial No. 530,150

5 Claims. (Cl. 74—603)

The invention relates to a crankshaft provided with counterweights to counterbalance the off-center masses located on the cranks or throws. In its specific embodiment as herein described, the invention comprises a one-piece, six-throw, seven-bearing shaft having twelve counterweights, viz., a counterweight for each cheek of each crank or throw.

The principal object of the invention is the construction of a crankshaft distinguished by its lightness, strength and freedom from deflection under the influence of distorting forces.

A further object is the provision of a one-piece crankshaft having hollow crankpins or journals and having the counterweights so positioned as not to interfere with the boring or machining of the cranks.

Further objects and advantages will appear more fully from the following description taken in connection with the accompanying drawing in which:

Figure 1 is an elevation partly in section, showing one embodiment of the invention.

Figure 2 is a cross-sectional view taken on line 2—2 of Figure 1, and

Figure 3 is a similar view taken on line 3—3 of Figure 1, but showing only two cranks and two counterweights.

Referring to the drawing, Figure 1 represents a crankshaft having seven main bearings or journals indicated by reference characters as A1 to A7, inclusive, numbered consecutively from left to right on the drawing. It will be understood that these journals serve to support the shaft in suitable bearing members on the frame of the engine or other structure in which the shaft is employed.

Between each two main bearings or journals is a crank comprising a crankpin which serves as a journal for a connecting rod by which torque is applied to turn the shaft. These crankpins are indicated on the drawing as B1 to B6, inclusive, reading from left to right. In order to secure the most effective distribution of metal from the standpoint of strength and weight, the main portion of the shaft is axially bored to leave it in the form roughly of a series of hollow cylinders and the crankpins are similarly bored as indicated at D1, D2, and D3 for crankpins B1, B2, and B3, respectively, and at D6 for crankpin B6.

The crankshaft has six cranks suitable for use with six cylinders or multiples thereof, and the cranks are positioned angularly at 120° to each other on each half of the shaft. That is, as shown in Figure 2, crankpin B2 is 120° clockwise from B1, and B3 is 120° clockwise from B2, being thus equally spaced about the axis of the shaft. On the right-hand end of the shaft, Figure 1, crankpin B4 is aligned with B3, B5 with B2, and B6 with B1.

In the counterbalancing of six-throw seven-bearing crankshafts, it has been proposed to apply counterweights to each cheek of each crank directly opposite the axis of the crankpin. This arrangement is designed to provide as nearly as possible direct counterbalancing in line with the direction in which the centrifugal force acts which is set up by the off-center masses of the crank and parts carried thereby. The mass of counterweights required, however, can be materially reduced by positioning the counterweights, or at least a part of them, at such angles that they serve to oppose the resultant of the forces due to two adjacent cranks.

Referring to the drawings, for example, the combined mass of C2 and C3 may be positioned so that the resulting centrifugal force will act in line with but oppositely to the resultant acting in the direction indicated at X of the forces produced by the off-center masses at B1 and B2. Similarly, weights C4 and C5 may be so positioned that their effect will act in counterbalancing the resultant acting in the direction Y due to the combined effect of B2 and B3. That the respective forces do not act in the same transverse plane may be disregarded since the only effect of the relatively small spacing of the transverse planes in which the forces act is to set up relatively minor couples within the shaft itself easily taken care of by the rigidity of the shaft.

In the present case, where the boring of the crankpins is desirable, it will be readily seen that the arrangement just described, if followed exactly for each weight, would not be feasible since counterweights C2 and C3 would lie in the axis of crankpin B3 and weights C4 and C5 in the axis of B1 and would obstruct the entrance of a machining tool into the bores D1 and D3, respectively. Therefore, in accordance with the present invention, the following solution is effected.

Counterweight C1 is located adjacent main bearing A1 and with its center of mass opposite the axis of B1. C2 is located on the other cheek of B1 but with its center of mass as near as possible to the longitudinal plane of the resultant X still leaving the bore D3 unobstructed. C3 is likewise located with its center of mass as near as possible to the plane of X but on the other side of D3 from C2. Thus it will be seen that the resultant of centrifugal forces due to C2 and C3 will be opposite to resultant X.

Similarly, counterweights C4 and C5 are skewed or twisted toward the longitudinal plane of the resultant Y leaving only the opening necessary for access of machining tools to the bore DI, the resultant of the centrifugal forces acting on these two counterweights thus lying in the longitudinal plane of Y and acting oppositely thereto.

Counterweight C6 adjacent the center main bearing A4 is located with its center of mass opposite the axis of B3. It will be noted that C6 is opposite the resultant of C2 and C3 and that CI is opposite the resultant of C4 and C5. Hence by properly proportioning the counterweights and proper radial disposition of their centers of mass, the entire shaft may be placed in both static and dynamic balance.

The parts of the shaft on the right side of the center bearing A4 (Figure 1) are in allochiral relation to those on the left side, i. e., the two ends of the shaft have what is called "mirror-symmetry." It is believed unnecessary, therefore, to describe in detail the arrangement of the right-hand end of the shaft otherwise than to point out that, as to the counterweights, CI corresponds in angular position and shape with C12, C2 with C11, C3 with C10, C4 with C9, C5 with C8, and C6 with C7.

The shaft may be provided at its ends with flanges 13, 14, whereby attachment may be made to driving or driven devices. It will be understood that if and where such flanges overlie the bores of the crankpins they will be cut away as shown to permit entry of suitable machining tools.

The arrangement described thus permits access to the bores of the crankpins by tools operating longitudinally of the axis throughout the entire length of the shaft since none of the parts lies in the axis of the pins or overlaps the bores thereof.

It will be noted that by the construction above described we are enabled to produce a counterweighted crankshaft capable of being forged initially in one piece thereby securing strength and reliability. Not only is a high degree of rigidity obtained with improved balance and resultant absence of deflection and vibration, but an actual reduction in the amount of metal required in the counterweights. These features are of especial advantage in the field of high speed aviation engines for which use the structure has been particularly designed.

We claim:

1. A one-piece six-throw, seven-bearing crankshaft having hollow crankpins and a counterweight associated with each cheek of the throws, the weights 1, 6, 7 and 12, numbered from one end of the shaft, being opposite the axes of adjacent crankpins, the weights 2, 3, 10, and 11 being angularly skewed toward the aligned axes of crankpins 3 and 4 without overlapping the bores thereof and the weights 4, 5, 8, and 9 being angularly skewed toward the aligned axes of crankpins 1 and 6 without overlapping the bores thereof.

2. A one-piece, six-throw, seven-bearing crankshaft having twelve counterweights and hollow crankpins, each weight being formed as an extension of a crank cheek toward the side of the shaft opposite the related crankpin, certain of the weights being located directly opposite the axis of the related pin and others being located at angles other than directly opposite the related pin, the weights being so positioned and proportioned as to place the shaft in static and dynamic balance, spaces being left between counterweights for access of tools to the crankpin bores throughout the length of the shaft.

3. A crankshaft having three throws spaced equally about the axis at angles of 120°, hollow crankpins associated with said throws and counterweights on each cheek of said throws, one pair of weights positioned to balance in part the resultant of the off-center masses of the first and second of said throws and another pair positioned to balance in part the resultant of the off-center masses of the second and third throws, the weights being so formed and located as not to overlie in end view of the shaft the bores of said crankpins.

4. A crankshaft having three throws spaced equally about the axis of the shaft and a journal between each two successive throws, a counterweight on each cheek of each throw, the weights adjacent to each of said journals being skewed from the axial planes of their respective throws toward the plane of the resultant of the forces due to the off-center masses of said throws and so positioned as to counterbalance at least in part the said resultant but located wholly outside the axis of any crankpin.

5. A six-throw crankshaft having twelve crank cheeks spaced longitudinally of the shaft and a counterweight on each crank cheek, the counterweight on each of cheeks 1, 6, 7 and 12, numbered consecutively from one end of the shaft, being located with its center of mass opposite that of the adjacent throw, the counterweights on each of the pairs of cheeks 2—3, 4—5, 7—8 and 9—10 being skewed from the planes of their respective throws and so positioned that their resultant is opposite the resultant of the off-center masses of the two adjacent throws but having their respective centers of mass on opposite sides of the plane of said resultants, all of said counterweights being in non-intersecting relation to the axes of the crankpins.

CHARLES J. McDOWALL.
DIMITRIUS GERDAN.

REFERENCES CITED

The following references are of record in the file of this patent:

UNITED STATES PATENTS

| Number | Name | Date |
| --- | --- | --- |
| 1,315,059 | Vincent | Sept. 2, 1919 |
| 1,661,341 | Oldson | Mar. 6, 1928 |